3,130,854
Patented Apr. 28, 1964

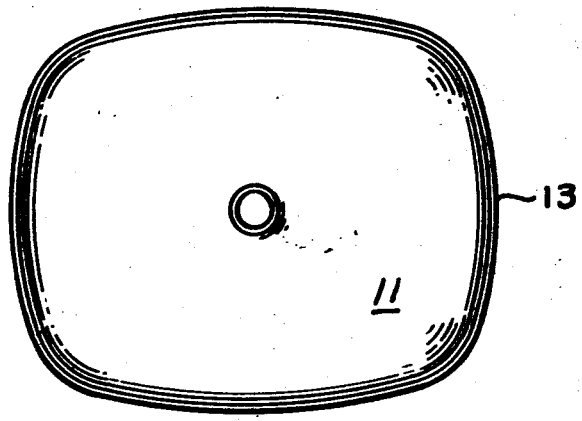
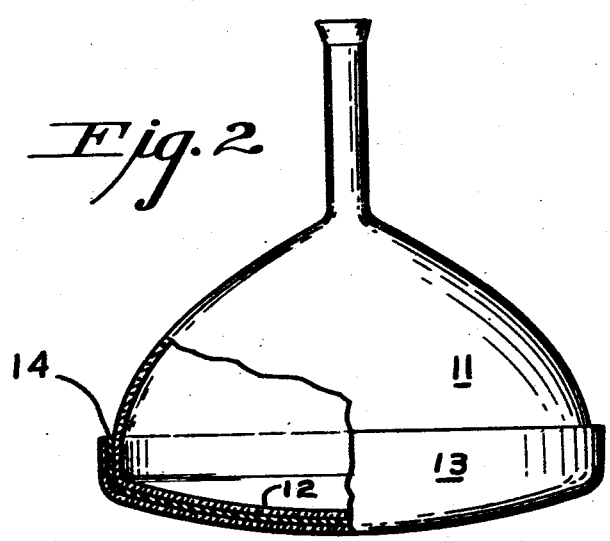
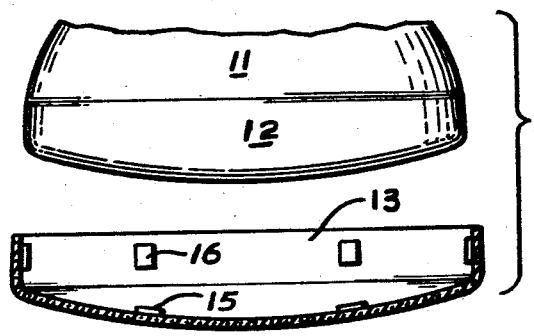

1

3,130,854
TELEVISION PICTURE TUBE ENVELOPE
Raoul J. Casciari, Corning, N.Y., assignor to Corning Glass Works, Corning, N.Y., a corporation of New York
Filed June 3, 1960, Ser. No. 33,736
3 Claims. (Cl. 220—2.1)

The present invention relates to improvements in all glass television receiver picture tubes and the like.

It has been the usual practice to separately form the panel or viewing screen portion and the funnel portion of the envelope of an all glass picture tube envelope and to then fusion seal them to one another.

Because of the high vacuum required in a picture tube, it has been necessary to impart special shapes to both the panel and funnel portions and to employ a relatively large volume of glass therein, and particularly in the panel, to give the tube the strength necessary to reasonably reduce the danger of its implosion while in use in a television set. As a further protection to a viewer it has been the further practice of the set manufacturers to enclose the picture tube in the receiver cabinet behind a window or mask of rigid plastic material or reinforced glass.

Because of shape limitations and the volume of glass in the panels of such picture tubes imposed by their strength requirements to produce a panel satisfactory to provide an undistorted viewing area of, for example 262 square inches, it is necessary to provide a panel having a glass weight of about 15 pounds. Moreover, although use of a mask of rigid plastic material adequately serves to protect a viewer, it places certain limitations on cabinet design and imposes need for use of cabinets of substantially greater depth than required by the tube per se. Also, irrespective of the caution taken to seal the space between the panel face and the mask, dust particles enter such space and become deposited on the mask and panel surfaces. Such particles hinder proper viewing and can not be readily removed.

It has heretofore been proposed to provide the tube face only with a glass lens, primarily with a view to improving the observation qualities of images illuminated on the tube face. It has been further proposed that a lens be attached to the tube face with a suitable adhesive and that, to improve the implosion resistance of the tube, a transparent sheet of a thermo-plastic material be incorporated between the tube face and the lens. Applicant has found that a tube so constructed is less likely to implode than are conventional forms of tubes, nevertheless they leave much to be desired in this respect. Moreover, the thermoplastic material lacks the necessary stability for satisfactory use at the tube operating temperatures. Conventional tubes having a viewing area of only 262 square inches will rarely withstand a hydrostatic pressure of 55 p.s.i., and will, upon failure, implode violently into small pieces. Tubes whose face plates only are provided with lenses and an intervening transparent sheet of thermoplastic or thermo-setting material usually withstand somewhat higher pressures, but frequently implode particularly following injury of their funnel portions, their greatest weakness having been found by applicant to be in the unprotected region of junction of their funnel and face plate.

According to the invention a television picture tube panel or face plate has permanently united therewith a skirted mask, preferably of glass. Such mask is preferably in substantially the form of the panel end of the picture tube and of a dimension to fit thereover and circumferentially thereabout in rather closely spaced relation therewith. The space between the exterior surfaces of the panel end of the tube and the oppositely disposed interior surfaces of the mask is filled with a clear thermo-setting resin having a refractive index matching that of the glasses embodied in the panel and mask, respectively, and having qualities rendering it highly adhesive to the respective glass surfaces.

The employment of a skirted mask in accordance with the invention overcomes or greatly reduces the objectionable features hereinbefore set forth of conventionally masked picture tubes, and tubes whose faces only have been protected, in that the employment of a skirted mask in accordance with the invention adds great strength to a picture tube permitting the economic advantage of a reduction in the volume of glass required to make it and less reliance on its shape for strength. As an example a picture tube panel can be formed with the radius of its curvature at the junction of the skirt and viewing portions such that a panel having a viewing area of 282 square inches need have a panel weight of only about 14 pounds compared to the approximately 15 pounds of glass required in a conventional picture tube having a viewing area of only 262 square inches. Such a picture tube with the front of its panel and mask extensively abraded will still withstand hydrostatic pressures of above 75 p.s.i. without fracture, and is implosion proof, remaining intact even when its exposed funnel portion is deliberately bruised to the degree necessary to promote a leakage fissure therein. Moreover, the skirt on the mask greatly facilitates its union with the tube through the medium of a chemically set plastic or so-called thermo-setting resin.

Also the resin filling between the mask and panel face directly reduces glare and widens the viewing angle by optically merging the mask and panel into a single lens. Additionally, picture distortion formerly resulting from surface imperfections in the opposed surfaces of the mask and panel are no longer present. Moreover, since minor irregularities in the exterior surface of the panel can no longer adversely affect the picture quality, the expense heretofore necessary to polish out such defects is made no longer necessary, thus further reducing their cost of manufacture. Other and further advantages of the invention will readily occur to those skilled in the art.

The methods of fabrication of a masked tube with the invention involve first thoroughly cleaning the opposed surfaces of the mask and the panel end of the tube. The mask is then placed face down on a level horizontal support and the tube projected thereinto and held with the front surface of the panel in a desired spaced relation with respect to the mask surface by suitable spacers arranged between the inner and outer surfaces of the mask and panel respectively. Alternatively, or additionally, spacers of cured resin can be arranged between the panel and mask faces to maintain the desired spacing. An appropriate thermo-setting plastic fluid, mixed with a catalyst for chemically setting it and carefully degassed, is then fed into the space between the mask and panel until such space is substantially completely filled to the top of the mask skirt.

An epoxy resin and a catalyst therefore found fully satisfactory for use in applicant's structure are manufactured by Dow Chemical Company of Midland, Michigan, and sold under the code numbers DER741 and DEH61 respectively. A mixture of 100 parts of 741 and 6.3 parts of 61, by weight has been found ideally suited to applicant's use. Such a mixture will gel within about 15 minutes and will be fully cured to a rubbery condition within a substantially longer period of time which may extend to several hours. To promote rapid curing of the resin, the panel and mask may be heated to about 90° C. It is also helpful for such purpose to heat the resin to a similar temperature.

For further details of the invention reference will hereinafter be made to the accompanying drawing in which:

FIG. 1 is a rear view of a television picture tube embodying the invention.

FIG. 2 is a side elevational view of the tube, partly broken away to show its construction.

FIG. 3 shows, in side elevation, a fragment of the panel end of a picture tube and a sectional elevation of the mask thereof into which such panel end of the tube is about to be introduced.

Referring to the drawing in detail, the numerals 11 and 12 designate, respectively, the funnel and panel portions of a television picture tube. The numerals 13 and 14 designate, respectively, the mask thereof and the resin filling between it and the panel 12. The numerals 15 and 16 designate two of a plurality of elements employed to hold the panel 12 suitably spaced from the mask 14 while the space therebetween is being filled with resin 14 and until such resin becomes cured. The elements 15 and 16 may be formed from cured pieces of the same resin as 14.

The method of assembly simply comprises arranging a number of elements such as 15 on the inner bottom surface of the mask 13 adjacent its skirt and then lowering the panel into the mask cavity. Additional elements such as 16 may then be wedged between the panel and mask skirts to center the panel in the mask cavity. Alternatively, the panel and mask may be held in a desired spaced relation solely by wedging a number of elements such as 16 between the skirts thereof. The resin 14, in an uncured state, is then carefully fed into the space between the panel 12 and mask 13. As previously mentioned if desired the curing of the resin may be accelerated by heating the panel, mask, and resin prior to their assembly.

This application is a continuation-in-part of my application Serial No. 776,320, filed November 25, 1958, which is now abandoned.

What is claimed is:

1. As an article of manufacture, a skirted television picture tube panel provided with a hollow skirted mask of rigid material whose wall is of no greater thickness than the wall of the panel having inner and outer surface contours similar to the corresponding surfaces of such panel and its skirt the interior of such mask being of a size to receive the panel and its skirt with a space remaining between opposed surfaces of the panel and mask and their skirts, said space being substantially filled with a fully cured rubbery plastic adhesively joined to such surfaces.

2. As an article of manufacture, a television tube envelope embodying panel and adjoining funnel portions respectively provided at its panel end with a hollow mask of rigid material whose wall is of no greater thickness than the wall of the panel having inner and outer surface contours similar to the contours of the corresponding surfaces of the tube panel portion and having a surrounding side wall of skirt of substantial depth similar in inside contour to the outside of the portion of the envelope adjoining the viewing surface of the panel which it surrounds, the internal dimensions of such mask being of a size to receive the panel end of the tube with a space remaining between its skirted panel and the mask filled with a fully cured rubbery thermoplastic resin adhesively joined to such surfaces.

3. As an article of manufacture a cathode ray tube envelope embodying a concavo-convex face portion having a surrounding skirt adjoining a funnel portion, a transparent concavo-convex cover element of rigid material also having a surrounding skirt, said cover element being disposed over said face portion and about its skirt portion, and a layer of fully cured rubbery thermo-plastic resin between such portions adhesively joined to the entire of the opposed surfaces thereof.

References Cited in the file of this patent

UNITED STATES PATENTS

| | | |
|---|---|---|
| 1,662,860 | Leslie | Mar. 20, 1928 |
| 2,293,529 | Bedford | Aug. 18, 1942 |
| 2,312,206 | Calbick | Feb. 23, 1943 |
| 2,346,810 | Young | Apr. 18, 1944 |
| 2,676,109 | Barnes et al. | Apr. 20, 1954 |
| 2,699,014 | Van Steenis | Jan. 11, 1955 |
| 2,734,142 | Barnes | Feb. 7, 1956 |
| 2,785,820 | Vincent | Mar. 19, 1957 |

OTHER REFERENCES

RCA TN No.: 114–RCA Technical Notes, published by The Radio Corporation of America, RCA Laboratories, Princeton, N.J., "Prevention of Kinescope Implosions," by K. C. Gasper, R. C. Coates, and R. I. Thompson.

UNITED STATES PATENT OFFICE
CERTIFICATE OF CORRECTION

Patent No. 3,130,854                                                 April 28, 1964

Raoul J. Casciari

It is hereby certified that error appears in the above numbered patent requiring correction and that the said Letters Patent should read as corrected below.

Column 2, line 27, for "facilitate" read -- facilitates --; column 4, line 11, for "of" read -- or --; line 24, strike out "portion", second occurrence.

Signed and sealed this 10th day of November 1964.

(SEAL)
Attest:

ERNEST W. SWIDER                                        EDWARD J. BRENNER
Attesting Officer                                             Commissioner of Patents